(12) United States Patent
Meythaler et al.

(10) Patent No.: US 11,779,080 B2
(45) Date of Patent: Oct. 10, 2023

(54) MATERIAL FOR SHOE UPPER

(71) Applicant: adidas AG, Herzogenaurach (DE)

(72) Inventors: Dirk Meythaler, Herzogenaurach (DE); Harald Geyer, Herzogenaurach (DE); Marco Fischhold, Herzogenaurach (DE); Robert Frank Kirk, Herzogenaurach (DE); Jack Huang, Herzogenaurach (DE); Bruno Jean Antonelli, Herzogenaurach (DE)

(73) Assignee: adidas AG, Herzogenaurach (DE)

( * ) Notice: Subject to any disclaimer, the term of this patent is extended or adjusted under 35 U.S.C. 154(b) by 755 days.

(21) Appl. No.: 16/917,006

(22) Filed: Jun. 30, 2020

(65) Prior Publication Data

US 2020/0329817 A1    Oct. 22, 2020

Related U.S. Application Data

(60) Continuation of application No. 15/683,814, filed on Aug. 23, 2017, now Pat. No. 10,750,826, which is a
(Continued)

(30) Foreign Application Priority Data

Feb. 24, 2012  (DE) .......................... 102012202866.8
Feb. 13, 2013  (EP) .................................... 13155073

(51) Int. Cl.
  *A43B 23/02*      (2006.01)
  *A43B 5/02*       (2006.01)
  (Continued)

(52) U.S. Cl.
  CPC ............ *A43B 23/0205* (2013.01); *A43B 5/02* (2013.01); *A43B 5/025* (2013.01); *A43B 23/026* (2013.01);
  (Continued)

(58) Field of Classification Search
  None
  See application file for complete search history.

(56) References Cited

U.S. PATENT DOCUMENTS 3,225,988 A    12/1965   Drenning
3,397,418 A     8/1968   Gorman et al.
(Continued)

FOREIGN PATENT DOCUMENTS

CN    1145759    3/1997
CN    1342046    3/2002
(Continued)

OTHER PUBLICATIONS

Office Action, German Patent Application No. 10 2012 202 866.8, dated Oct. 7, 2022, 12 pages.
(Continued)

*Primary Examiner* — Arti Singh-Pandey
(74) *Attorney, Agent, or Firm* — Kilpatrick Townsend & Stockton LLP

(57) ABSTRACT

Described are materials for a shoe upper, in particular for soccer shoes, with a particularly low weight. The material includes an inner polyurethane layer, an outer polyurethane layer, and a textile reinforcing layer. The textile reinforcing layer is arranged between the inner polyurethane layer and the outer polyurethane layer. The inner polyurethane layer and the outer polyurethane layer comprise thermoset polyurethane. The textile reinforcing layer comprises apertures through which the inner polyurethane layer and the outer polyurethane layer are connected to each other.

19 Claims, 5 Drawing Sheets

Related U.S. Application Data division of application No. 13/774,844, filed on Feb. 22, 2013, now Pat. No. 9,775,409.

(51) Int. Cl.

| | | |
|---|---|---|
| *B32B 7/027* | (2019.01) | |
| *B32B 7/023* | (2019.01) | |
| *B32B 5/02* | (2006.01) | |
| *B29D 35/12* | (2010.01) | |
| *B29C 39/14* | (2006.01) | |
| *B29C 39/18* | (2006.01) | |
| *B32B 27/12* | (2006.01) | |

(52) U.S. Cl.
CPC ...... *A43B 23/0225* (2013.01); *A43B 23/0235* (2013.01); *A43B 23/0255* (2013.01); *B29C 39/146* (2013.01); *B29C 39/18* (2013.01); *B29D 35/126* (2013.01); *B32B 5/028* (2013.01); *B32B 7/023* (2019.01); *B32B 7/027* (2019.01); *B32B 27/12* (2013.01); *Y10T 428/24347* (2015.01); *Y10T 428/24942* (2015.01); *Y10T 442/10* (2015.04)

(56) References Cited

U.S. PATENT DOCUMENTS

| | | | |
|---|---|---|---|
| 4,248,652 | A | 2/1981 | Civardi et al. |
| 4,263,356 | A | 4/1981 | Nomura et al. |
| 4,733,546 | A | 3/1988 | Toda |
| 4,853,054 | A | 8/1989 | Turner et al. |
| 4,882,208 | A | 11/1989 | Breitscheidel et al. |
| 4,963,412 | A | 10/1990 | Kokeguchi |
| 5,393,600 | A | 2/1995 | Omura et al. |
| 6,171,680 | B1 | 1/2001 | Fahmy |
| 6,558,784 | B1 | 5/2003 | Norton et al. |
| 6,777,524 | B1 | 8/2004 | Shimizu et al. |
| 7,178,267 | B2 | 2/2007 | Skaja et al. |
| 7,941,942 | B2 | 5/2011 | Hooper et al. |
| 9,763,494 | B2 | 9/2017 | Antonelli et al. |
| 9,775,409 | B2 | 10/2017 | Meythaler et al. |
| 10,182,618 | B2 | 1/2019 | Kirk et al. |
| 2002/0018892 | A1 | 2/2002 | Satake et al. |
| 2002/0148142 | A1 | 10/2002 | Oorei et al. |
| 2003/0093924 | A1 | 5/2003 | Delgorgue et al. |
| 2005/0054252 | A1 | 3/2005 | Baciu et al. |
| 2005/0126038 | A1 | 6/2005 | Skaja et al. |
| 2005/0208860 | A1 | 9/2005 | Baron et al. |
| 2006/0083929 | A1 | 4/2006 | Lee |
| 2007/0066173 | A1 | 3/2007 | Teofrasti et al. |
| 2007/0199210 | A1 | 8/2007 | Vattes et al. |
| 2008/0022554 | A1 | 1/2008 | Meschter et al. |
| 2008/0116043 | A1 | 5/2008 | Chahal et al. |
| 2008/0161430 | A1 | 7/2008 | Korwin-edson et al. |
| 2009/0042471 | A1 | 2/2009 | Cashin et al. |
| 2010/0037483 | A1 | 2/2010 | Meschter et al. |
| 2010/0175276 | A1 | 7/2010 | Dojan et al. |
| 2011/0088282 | A1 | 4/2011 | Dojan et al. |
| 2011/0250811 | A1 | 10/2011 | Feng et al. |
| 2012/0066931 | A1 | 3/2012 | Dojan et al. |
| 2012/0100334 | A1 | 4/2012 | Adams et al. |
| 2012/0255201 | A1 | 10/2012 | Little |
| 2013/0055590 | A1 | 3/2013 | Mokos |
| 2015/0208762 | A1 | 7/2015 | Chapdelaine et al. |
| 2018/0035757 | A1 | 2/2018 | Meythaler et al. |

FOREIGN PATENT DOCUMENTS

| | | |
|---|---|---|
| DE | 3919763 | 12/1989 |
| DE | 102007045739 | 4/2009 |
| DE | 102009028627 | 3/2011 |
| EP | 2649898 | 10/2013 |
| JP | 2116806 | 9/1990 |
| JP | 3059174 | 7/2000 |
| JP | 2002537878 | 11/2002 |
| JP | 2004505654 | 2/2004 |
| JP | 2009202032 | 9/2009 |
| JP | 2010534535 | 11/2010 |
| JP | 2011528935 | 12/2011 |
| WO | 2010024249 | 3/2010 |
| WO | 2010110661 | 9/2010 |

OTHER PUBLICATIONS

U.S. Appl. No. 13/774,844, Final Office Action dated Mar. 3, 2016, 9 pages.

U.S. Appl. No. 13/774,844, Non-Final Office Action dated Jul. 8, 2015, 18 pages.

U.S. Appl. No. 13/774,844, Notice of Allowance dated Jul. 6, 2017, 8 pages.

U.S. Appl. No. 14/149,802, Non-Final Office Action dated Nov. 7, 2016, 8 pages.

U.S. Appl. No. 14/149,802, Notice of Allowance dated May 23, 2017, 7 pages.

U.S. Appl. No. 15/683,366, Final Office Action dated Oct. 22, 2019, 13 pages.

U.S. Appl. No. 15/683,366, Non-Final Office Action dated Jun. 10, 2019, 16 pages.

U.S. Appl. No. 15/683,814, Final Office Action dated Oct. 22, 2019, 16 pages.

U.S. Appl. No. 15/683,814, Non-Final Office Action dated Jun. 13, 2019, 14 pages.

U.S. Appl. No. 15/683,814, Notice of Allowance dated Apr. 16, 2020, 8 pages.

Chinese Patent Application No. 201310058276.0, Office Action dated Nov. 25, 2014, 9 pages.

German Patent Application No. 102012202866.8, Office Action dated Apr. 28, 2017, 7 pages.

German Patent Application No. 102012202866.8, Office Action dated May 23, 2019, 12 pages (machine English translation provided).

Dow et al., "Preliminary Investigations of Feasibility of Weaving Triaxial Fabrics (Doweave)", Textile Research Journal, Retrieved from Internet: https://doi.org/10.1177/004051757004001106, vol. 40, Issue 11, Nov. 1, 1970, pp. 986-998.

European Patent Application No. 13155073.3, Extended European Search Report dated May 22, 2013, 7 pages.

FXI , "Discoloration of Polyurethane Foam", available online at http://web.archive.org/web/201 01124143851 /http://fxi.com/assets/pdf/up_06_quality/Discoloration_Info_Sheet_-_111010.pdf, Nov. 2010, 2 pages.

Japanese Patent Application No. 2013-033653, Office Action dated Jan. 17, 2017, 4 pages (A summary of the Office Action was provided in the Transmittal Letter accompanying the IDS filed Mar. 17, 2017 in U.S. Appl. No. 13/774,844.).

Niles Fence & Security, "Explaining Expanded Metal Mesh", available on the internet at http://www.nilesfence.com/files/technical-information-mesh.pdf, at least as early as Feb. 26, 2015, 3 pages.

Tortora et al., Understanding Textiles, 5th Edition, p. 290, 1997, 3 pages.

MATERIAL FOR SHOE UPPER

CROSS REFERENCE TO RELATED APPLICATION

This is a continuation of U.S. patent application Ser. No. 15/683,814, filed Aug. 23, 2017 (allowed), entitled MATERIAL FOR SHOE UPPER ("the '814 application"), which is a divisional of U.S. patent application Ser. No. 13/774,844, filed on Feb. 22, 2013 (PAT 9775409), entitled MATERIAL FOR SHOE UPPER ("the '844 application"), which is related to and claims priority benefits from German Patent Application No. DE 10 2012 202866.8, filed on Feb. 24, 2012, entitled MATERIAL FOR SHOE UPPER ("the '866 application"), and European Patent Application No. 13155073.3, filed on Feb. 13, 2013, entitled MATERIAL FOR SHOE UPPER ("the '073 application"). The '814, '844, '866, '073 applications are hereby incorporated herein in their entireties by this reference.

FIELD OF THE INVENTION

The present invention relates to a material for a shoe upper, in particular for soccer shoes, with a particularly low weight.

BACKGROUND

Athletes cover great distances. In order to reduce the energy required for that, the weight, particularly also of sports shoes, is desired to be reduced. A reduced weight requires less force during accelerations, for example, and thus reduces the strain on the muscles of a player or runner.

An essential factor determining the weight of a shoe is the material of the shoe upper, which determines the weight of the sports shoe in combination with the sole. Indeed, the weight of the shoe upper may in principle be reduced by simply using less material, for example, by reducing material thicknesses. On the other hand, the shoe upper has to fulfill high quality standards, for example, with respect to abrasion resistance, flexibility, lamination, or stability. In order to fulfill these different requirements, use of multilayer or composite materials may be desirable.

Different shoe uppers with multilayer materials are known in the prior art, such as the combination of a textile material with a plastic layer. For example, DE 10 2009 028 627 A1 describes a shoe upper with textile materials, for example a nylon fabric. The textile material may be additionally enhanced on the outside and/or the inside by an appropriate coating, for example by a transparent layer made from thermoplastic polyurethane ("TPU"), which is glued onto the textile material with hot glue.

US 2010/0037483 A1 describes a material for a shoe upper in which fibers are arranged between a base layer and a cover layer for which a thermoplastic polymer material, for example TPU, may be used. Similar materials for a composite material for a shoe upper are described in U.S. Pat. Nos. 3,397,418, 6,558,784 B1, and 7,941,942 B2. Furthermore, US 2007/0199210 A1 describes a material in which a middle layer is arranged between a first layer and a second layer. The middle layer is a textile fabric, and the first and the second layers may be made from a foam material, for example, ethylene-vinyl acetate ("EVA") foam.

US 2011/0088282 A1 describes a composite material for a shoe upper having an outer skin layer and a substrate layer, between which a fabric layer is arranged. The substrate layer may comprise a laminate with a first material layer (e.g. leather) and a second material layer (e.g. TPU). The outer skin layer may consist of TPU or a multilayer material, for example, an outer layer from thermoset polyurethane ("PUR") or TPU, and an inner layer from TPU.

However, the use of TPU has various disadvantages. For example, TPU discolors when exposed to light (yellowing). This property impairs the quality of the material. Further, TPU is susceptible to hydrolysis. This characteristic may result in delamination of layers of material. Furthermore, a good bond of TPU with other materials usually requires an additional adhesive layer, which often results in higher weight, delamination of material layers, or impaired material quality. In general, TPU has certain mechanical material properties that may be undesirable, depending on the application. For example, TPU is stiff and inflexible due to the required adhesive layer.

In contrast, omitting the adhesive layer with TPU may also lead to problems. For example, a bond between TPU and PUR without an adhesive layer does not create a sufficient bond, since different materials are used.

It is therefore desirable to provide a composite material for a shoe upper for sports shoes to overcome at least parts of the specified disadvantages of the prior art and thus to provide a shoe that is particularly light without a loss of quality.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments, a material for a shoe upper comprises an inner polyurethane layer, an outer polyurethane layer, and a textile reinforcing layer. The textile reinforcing layer is arranged between the inner polyurethane layer and the outer polyurethane layer. The inner polyurethane layer and the outer polyurethane comprise thermoset polyurethane. The textile reinforcing layer comprises apertures through a plurality of which the inner polyurethane layer and the outer polyurethane layer are connected to each other.

The use of a polyurethane layer on both sides of the textile reinforcing layer provides a good bond between the two polyurethane layers, which may be further enhanced when the material is pressed under heat. Because the polyurethane layers have the same or substantially similar melting points and material properties, a better bond may be achieved between them than between a polyurethane layer and TPU.

The inner polyurethane layer and the outer polyurethane layer may connect to each other particularly well through a plurality of the apertures in the reinforcing layer when pressure and/or heat are applied, for example during a pressing process, thus reliably embedding the textile reinforcing layer arranged there between. This structure results in a material for a shoe upper that combines the elastic properties of the polyurethane layers and the durability and tensile strength of the textile reinforcing layer.

The use of thermoset polyurethane causes the inner polyurethane layer and the outer polyurethane layer to be elastic and thus particularly well suitable as a material for a shoe upper. In contrast, the use of TPU causes yellowing and results in hydrolysis (i.e., the chemical bonds are disintegrated in water). Furthermore, in contrast to TPU, no additional adhesive layer reducing elasticity is necessarily required.

The inner polyurethane layer and the outer polyurethane layer may comprise a mixture of polyester and polyether. A higher proportion of polyester results in better mechanical properties, such as increased tensile strength or increased hardness, for example. A higher proportion of polyether results in better chemical properties, such as resistance to hydrolysis and UV stability (due to aliphatic compounds in the polyether).

In some embodiments, the thermoset polyurethane comprises aliphatic isocyanate. The use of this material has the advantage that the material does not yellow, in contrast to TPU.

The textile reinforcing layer may comprise a non-thermoplastic material. Such a material has advantages for the design and the appearance of the material, since it does not melt when subject to heat and pressure. The textile structure of the reinforcing layer may therefore be maintained, even during pressing. This feature may also be advantageous to the feel of the material. As a result, different structures in the textile reinforcing layer may result in different designs and surface structures.

The apertures in the textile reinforcing layer may each comprise areas in the range of about 0.25 $mm^2$ to about 9 $mm^2$. These proportions have proven advantageous to achieving a good bond between the inner layer and the outer layer, while also still achieving sufficient durability of the textile reinforcing layer.

In some embodiments, at least one of the inner polyurethane layer and the outer polyurethane layer comprises at least two polyurethane sublayers. The polyurethane sublayers comprise different properties, respectively. They can differ in terms of thickness, material properties (such as melting point), or color, for example. Two, several, or all sublayers may differ in terms of their properties.

In some embodiments, a first polyurethane sublayer of the at least two polyurethane sublayers has a lower melting point and is arranged closer to the textile reinforcing layer than a second polyurethane sublayer of the at least two polyurethane sublayers. Such an arrangement supports melting together the inner polyurethane sublayer and the outer polyurethane sublayer through the holes of the textile reinforcing layer, since the first polyurethane sublayers of the inner and the outer polyurethane layers, respectively, melt more rapidly and therefore connect to each other more rapidly/easily, whereas the respective second polyurethane layers do not melt. Thus, the appearance of the outside of the material does not change.

According to further aspects, the invention comprises a shoe upper with the previously described material.

A still further aspect is a method of manufacture of such a material for a shoe upper in which a textile reinforcing layer is arranged between an inner polyurethane layer and an outer polyurethane layer and is pressed under heat. This stage may be carried out by means of a press, for example.

In certain embodiments, the method comprises the steps of (a) pouring a first polyurethane layer in liquid form onto a release layer (e.g. release paper), (b) applying a textile reinforcing layer comprising apertures onto the first polyurethane layer, and (c) pouring a second polyurethane layer in liquid form onto the textile reinforcing layer, such that the first polyurethane layer and the second polyurethane layer bond together through a plurality of the apertures of the textile reinforcing layer.

Such a method allows for easy and fast manufacturing of the material. Because the polyurethane layer is liquid when applied onto the textile reinforcing layer, it bonds with the textile reinforcing layer and runs through a plurality of the apertures of the textile reinforcing layer and bonds with the polyurethane layer on the other side of the textile reinforcing layer. Thus, the bond between both polyurethane layers and to the textile reinforcing layer becomes very strong.

The first polyurethane layer may correspond to the inner polyurethane layer mentioned above and the second polyurethane layer may correspond to the outer polyurethane layer mentioned above or vice versa.

According to certain embodiments, at least one of the inner polyurethane layer and the outer polyurethane layer comprises polyurethane sublayers being subsequently poured onto one another. This process allows, for example, to use polyurethane with improved bonding capabilities for the respective inner sublayers, whereas more abrasion-resistant polyurethane may be used for the respective outer sublayer.

The sublayers may be poured onto one another, such that the first polyurethane layer comprises a reverse order of sublayers compared to the second polyurethane layer. Thus, a symmetric assembly of layers results, which can be used with either orientation (i.e., the first polyurethane layer may be used as the outer polyurethane layer and the second polyurethane layer may be used as the inner polyurethane layer and vice versa).

Heat may be applied after at least one of step (a) and step (c). The liquid layers, which are in contact through a plurality of the apertures of the textile reinforcing layer, bond together when dried by applying heat. Furthermore, the polyurethane layers bond to the textile reinforcing layer by this step.

According to some embodiments, the method comprises the step of (d) pressing the first polyurethane layer, the textile reinforcing layer, and the second polyurethane layer after step (c). A final pressing step enhances the bond between both polyurethane layers and with the textile reinforcing layer even further.

The method may be a continuous process, and the release layer and the textile reinforcing layer may be supplied from respective rolls. This embodiment provides an efficient and fast production of the compound material.

Further embodiments of the material, shoe upper, and methods according to the invention are described in the dependent claims.

BRIEF DESCRIPTION OF THE DRAWINGS

In the following detailed description, embodiments of the invention are described referring to the following figures.

DETAILED DESCRIPTION

The subject matter embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

In the following, examples of embodiments and modifications of the present invention are described with respect to a material for a shoe upper. This material may be used for sports shoes and in particular for soccer shoes. However, it can also be used for other shoes, e.g. for basketball shoes, which require both a low weight and good mechanical properties, as described in the following.

Figure 1:
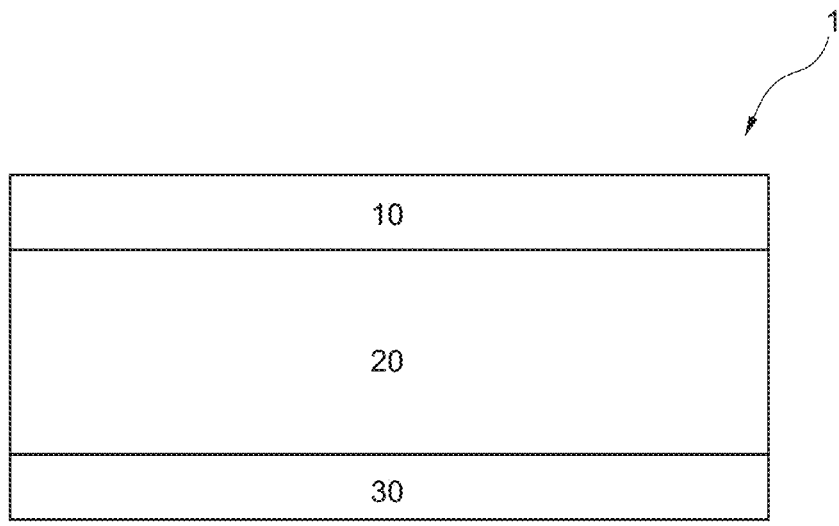
FIG. 1 is a schematic cross-sectional view of a material for a shoe upper according to certain embodiments of the present invention.

FIG. 1 illustrates an example of certain embodiments of a material 1 for a shoe upper. FIG. 1 particularly shows a schematic cross-sectional view of such a material 1. This illustration does not represent proportions, which will be discussed in more detail below. As can be recognized in FIG. 1, material 1 comprises an inner polyurethane layer 10, a textile reinforcing layer 20, and an outer polyurethane layer 30. The textile reinforcing layer 20 is arranged between the inner polyurethane layer 10 and the outer polyurethane layer 30. The polyurethane layers 10, 30 may be polyurethane films 10, 30. In other embodiments, the polyurethane layers 10, 30 may also be cast. In the following, polyurethane films 10, 30 are discussed, which will be simply referred to as PUR films 10, 30.

The term inner PUR film 10 refers to the fact that this film is arranged on the inside of a shoe upper for which the material 1 is used. The designation outer PUR 30 film refers to the fact that this film is arranged on the outside of a shoe upper for which the material 1 is used.

The inner PUR film 10, the textile reinforcing layer 20, and the outer PUR film 30 are grouted under heat and pressure. During this step, the inner PUR film 10 and the outer PIA film 30 bond together (via melting) through a plurality of the apertures in the textile reinforcing layer 20, such that a reliable connection is formed. At the same time, the inner PUR film 10 and the outer PUR film 30 enclose the threads of the textile reinforcing layer 20, thus creating a connection between the textile reinforcing layer 20 and the PUR films 10, 30. This will be discussed in more detail in the following.

In certain embodiments, the inner PUR film 10 and the outer PUR film 30 comprise a mixture of polyester and polyether. In this regard, a higher proportion of polyester results in better mechanical properties, such as increased tensile strength or increased hardness, for example. A higher proportion of polyether results in better chemical properties, such as UV stability and resistance to hydrolysis due to aliphatic compounds in the polyether.

In some embodiments, a mixture ratio of polyester to polyether of 65% to 35% is used, in order to simultaneously ensure high cost efficiency and sufficient quality, particularly UV stability and resistance to hydrolysis. However, one of ordinary skill in the relevant art will understand that any suitable mixture ratio of polyester to polyether may be used that results in the desired properties.

Due to the mixture of polyester and polyether, the PUR film is provided with its advantages, in particular over TPU. One advantage of the PUR film is its high elasticity as compared to TPU. Further, the PUR film comprises better resistance to hydrolysis than TPU.

Apart from polyether and polyester, the PUR film may also comprise polyisocyanate. In some embodiments, aliphatic polyisocyanate is used in this regard. The inclusion of polyisocyanate may prevent the PUR film from yellowing (UV stability) and also provide the PUR film with hydrolysis-resistant properties, which is a further advantage over the use of TPU.

In some embodiments, the material 1 consists of the inner PUR film 10, the textile reinforcing layer 20, and the outer PUR film 30.

The use of a PIA film on both sides of the textile reinforcing layer 20 may provide a good bond between the two films 10, 30, which is achieved during pressing of the material 1 under heat and/or pressure. In contrast, when using TPU, an additional hot-glue layer may be required in order to achieve a reliable bond of the TPU with a further TPU layer or another material. Omitting the hot-glue layer simplifies the method of manufacture for the material, and leads to a lower weight product, in accordance with certain embodiments of the invention. The use of two PUR films may also be beneficial because the PUR films have the same melting points and the same material properties, so that a better bond may be achieved between the PUR films 10, 30, rather than between a PUR film and TPU.

The bond between the PUR films 10, 30 may be strong enough to meet the physical requirements of a shoe upper, particularly for soccer shoes, in combination with a corresponding textile reinforcing layer 20 with a sufficient density of meshes. In this regard, the use of a hot-glue film may be omitted, where the hot-glue film may have a negative influence on the dynamic properties and/or the weight of the material. The materials and/or configuration of the textile reinforcing layer 20 may be specifically chosen to accommodate the properties of the PUR films 10, 30, in order to ensure a sufficient bond. Thus, the textile reinforcing layer 20 is developed specifically with regard to these requirements. The microstructure of the substrate and specifically the properties of the conditioned thread (e.g. napped thread), as well as the type of weaving technique, define the quality of the bond between the PUR films 10, 30 and the textile reinforcing layer 20. A good transparency of the material 1 and a sufficient bond require either sufficiently large apertures or many small apertures.

The textile reinforcing layer 20 alone has a tensile strength and a tear strength of at least about 30 N. The film alone has a tensile strength of at least about 6 N. The combination of the PUR films 10, 30 and the textile reinforcing layer 20 has a tensile strength of at least about 100 N.

The polyurethane used for the PUR films 10, 30 may be a thermoset polyurethane, which comprises an additional curing agent that provides the PUR film with its structural performance by heating during manufacture. In contrast, TPU may be reshaped by being heated again.

In certain embodiments, the textile reinforcing layer 20 comprises apertures that enable the inner PUR film 10 and the outer PUR film 30 to bond together (via melting) through a plurality of the apertures (i.e., the apertures reach through the entire thickness of the textile reinforcing layer 20).

The material of the textile reinforcing layer may be a non-thermoplastic material so that only the inner PUR film 10 and the outer PUR film 30 are melted together. The material of the textile reinforcing layer 20 may alternatively also consist of a thermoplastic material (e.g. polyamide/nylon), so that this material also merges with the PUR films. For design purposes and the outer appearance of the material 1, a non-thermoplastic material may be used. Melting together of the films may result in different color effects. PUR films 10, 30 may also be printed.

Depending on the thickness of the textile reinforcing layer 20, its structure may be felt through the PUR film and may also be visible, if transparent PUR films are used. In this way, different surface structures having different properties, e.g. friction coefficients, may be manufactured. Furthermore, visual effects may be achieved by the use of different materials for the textile reinforcing layer 20 and different colors for the PUR films 10, 30.

Figure 2:
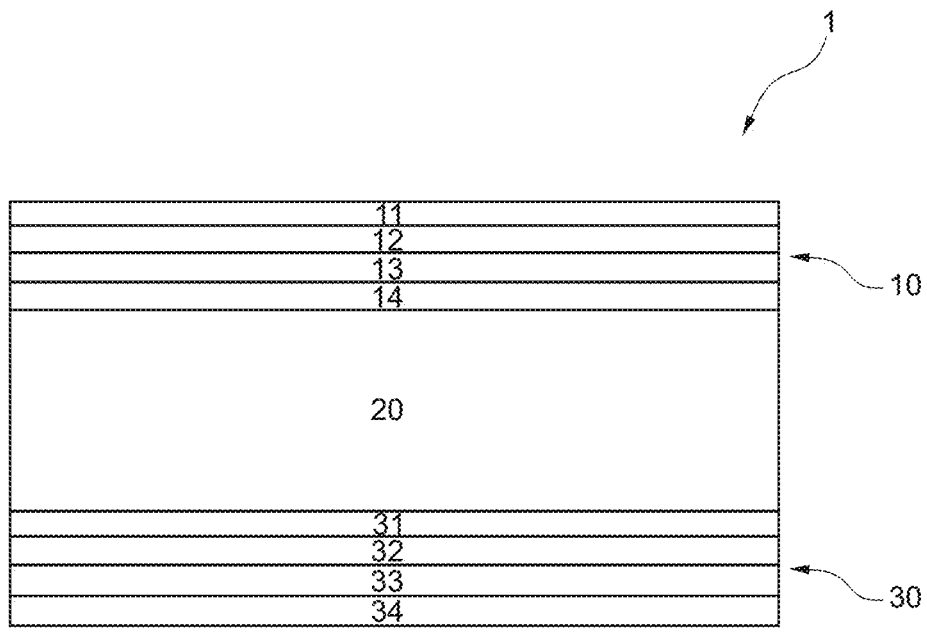
FIG. 2 is a schematic cross-sectional view of a material for a shoe upper according to certain embodiments of the present invention.

FIG. 2 illustrates certain embodiments of the material 1 for a shoe upper, in which the inner PUR film 10 comprises four film layers 11-14 and the outer PUR film 30 comprises four film layers 31-34. Each of these layers may have a thickness of about 0.02 mm, so that the inner PUR film 10 and the outer PUR film 30 each have a thickness of about 0.08 mm. In other embodiments these sizes may vary. In particular, the individual film layers 11-14 and 31-34 may have different thicknesses.

The film layers are also referred to as sublayers.

The use of film layers may provide a substantially uniform film thickness, among other things. Thus, the use of four film layers, each with a thickness of about 0.2 mm, results in a substantially uniform layer thickness of about 0.8 mm.

Figure 4:
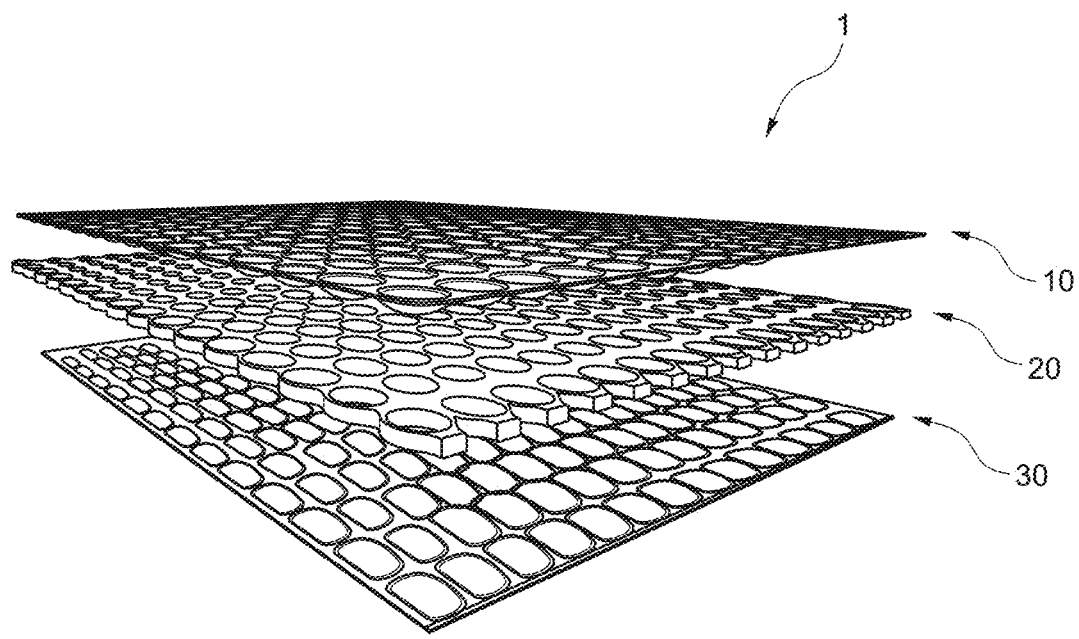
FIG. 4 is a schematic view of a material for a shoe upper according to certain embodiments of the present invention.

In further embodiments, as shown in FIG. 4, the film layers may have a thickness ranging from about 0.10-0.16 mm.

Film layer 14 of the inner PUR film 10 and the film layer 31 of the outer PUR film 30, both of which face the textile reinforcing layer 20, may have a lower melting point than the outer layers 11, 12, 13 and 32, 33, 34. During pressing of material 1, the inner PUR film 10 and the outer PUR film 30 may therefore be melted together under heat without a separate bonding layer being required and without the outer PUR film layers melting and their appearance on the surface being altered. The inner film layers melt more rapidly, thus facilitating melting without changing the outer film layers. Film layers 14 and 31, for example, may have a melting point of about 100-150° C., and may further have a melting point of about 130° C. The outer film layers 11, 12, 13 and 32, 33, 34 may have a melting point of about 150-200° C., and may further have a melting point of about 160° C.

In further embodiments, film layers 13 and 32, which are adjacent to the above-mentioned film layers 14 and 31, respectively, also have a lower melting point than the other film layers 11, 12 and 33, 34.

In further embodiments, the number of layers and their thicknesses may vary. In particular, the inner PUR film 10 and the outer PUR film 30 may have different numbers of layers and have different properties. The inner PUR film 10 and the outer PUR film 30 may therefore be adjusted to their functions as inner and outer surfaces of a shoe upper, respectively. For example, the outer PUR film 30 (or only the outermost film layer) might be designed for high abrasion, which may be important for a soccer shoe.

In theory, the polyurethane sublayers of the inner PUR film 10 and the outer PUR film 30 may have different properties. The properties may differ in terms of thickness (as described above), material properties (such as melting point), or color, as examples. Two, several, or all sublayers may differ in terms of their properties.

A further aspect of embodiments of the invention relates to a shoe upper with the previously described material and a shoe with such a shoe upper.

As described above, different surface structures may be generated by the use of different materials for the textile reinforcing layer 20, since the surface of the outer PUR film 30 adapts to the surface of the textile reinforcing layer 20 arranged below and therefore leads to a textured surface. Thus, due to different textile reinforcing layers, it is possible to create zones with different surface textures, which fulfill different functions, in a shoe upper. For example, a soccer shoe may comprise zones which have different frictions or adhesions when in contact with a ball. Thus, for example, zones of a soccer shoe which are often used for dribbling, may be provided with increased friction on the surfaces of those zones by selecting a corresponding surface structure, so as to ensure good control of the ball.

Figure 3:
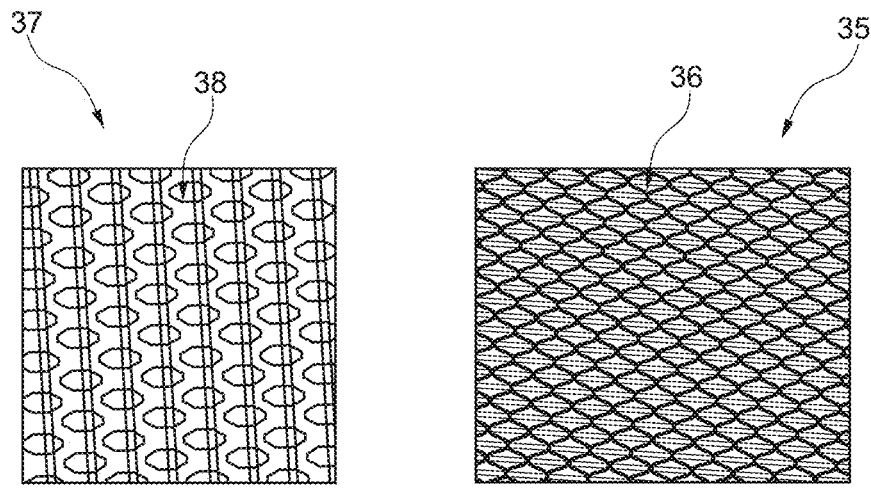
FIG. 3 illustrates materials for a textile reinforcing layer according to certain embodiments of the present invention.

FIG. 3 shows two examples of textile reinforcing layers 35, 37. The size of apertures 36, 38 in the textile reinforcing layers 35, 37 may be in the range of about 0.25 $mm^2$ to about 9 $mm^2$. In this range of sizes, there is still good bonding between the inner PUR film 10 and the outer FUR film 30 without the size of the holes obstructing the mechanical properties of the textile reinforcing layer 20. In some embodiments, as shown in FIG. 4, the diameter of the apertures is in the range from about 0.1-0.2 mm.

In this regard, the apertures may have a range of geometries from circular to diamond-shaped. The meshes, threads, or fibers of the textile reinforcing layer 20 may be reinforced by horizontal or vertical threads in order to reinforce shape of the geometries and ensure a better bond.

In some embodiments, a flat textile reinforcing layer is used, because no three-dimensional structure is desired (i.e., the surface is to be as smooth as possible and the film is not intended to melt into the textile reinforcing layer). In principle, both smooth and structured surfaces are possible.

Although the resulting material 1 for a shoe upper has a very low weight, this material passes quality tests with respect to at least abrasion resistance, flexibility, delamination, UV stability, resistance to hydrolysis, and mechanical stability (such as tensile strength, tear strength, seam resistance).

FIG. 4 shows an example of certain embodiments of a material 1 for a shoe upper in an exploded diagram. Material 1 comprises an inner polyurethane film 10, a textile reinforcing layer 20, and an outer polyurethane film 30. The two films 10, 30 consist of film layers with a thickness ranging from about 0.10-0.16 mm. The textile reinforcing layer 20 comprises a polyether thread and has openings with diameters ranging from 0.1-0.2 mm. In certain embodiments, the textile reinforcing layer 20 has a flat structure (two-dimensional mesh).

Material 1, as shown in 4, has a weight of approximately 27-28 g (A4 format), which corresponds to a weight of approximately 450-470 g/m².

The weight of the textile reinforcing layer 20 amounts to approximately 8-12 g (A4 format), which corresponds to a weight of proximately 130-200 g/m². Accordingly, the weight of the inner polyurethane film 10 and of the outer polyurethane film 30 each ranges from approximately 135-160 g/m², respectively.

Figure 5:
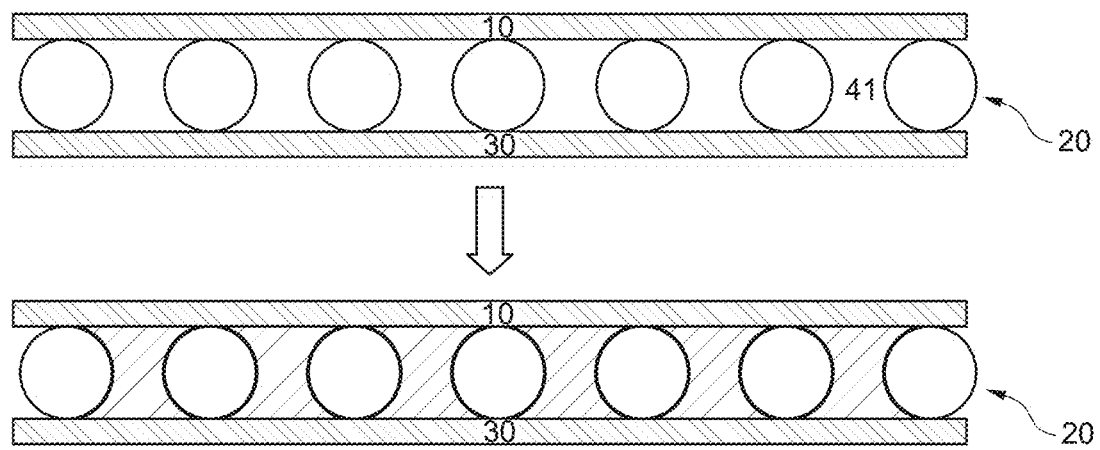
FIG. 5 is an illustration of the manufacture of a material according to certain embodiments of the present invention.

According to certain embodiments, FIG. 5 illustrates the manufacturing process for a material 1 described above, by showing a schematic cross-sectional view of the material before and after manufacture. The material before manufacture is depicted in the upper area of FIG. 5 and the material after manufacture is depicted in the lower area of FIG. 5. The textile reinforcing layer 20 is indicated by circles, which may, for example, represent a cross-section through fibers of the textile reinforcing layer 20, and by the apertures 41 arranged there between. By applying heat and/or pressure indicated by the arrow in the center of FIG. 5 the inner RJR film 10 and the outer PUR film 30 may melt together to form liquid material filling the apertures 41. The corresponding illustrations in FIG. 5 are purely schematic and do not represent proportions.

A PUR film 10, 30 with several layers, as illustrated in FIG. 2, is manufactured on a substrate. The layers are subsequently applied onto the substrate in a liquid state. All four layers may then be cured in an oven, which leads to a PUR film as described above.

In certain embodiments, the film layers may also be directly attached to the textile reinforcing layer 20.

Figure 6:
FIG. 6 is a perspective view of a soccer shoe with a material according to certain embodiments of the present invention.

FIG. 6 shows a soccer shoe 2 in which the material 1 described above is used. An area (ribbon) 50 reinforced with aramid yarns (e.g. Kevlar®) for stabilizing lateral movements is arranged in the lateral mid-foot area of the soccer shoe. Area 50 supports the foot in movements in which the foot is bent inwards. For example, area 50 supports the foot when the foot lands on the ground if the leg is angled towards the inside of the foot. This prevents the danger of "twisting" the ankle.

Material 1 described above is thin, which may be desirable in view of the low weight requirements for a sports shoe, but also may have minimal cushioning properties. In certain embodiments, it may be desirable to increase the cushioning of material 1 for certain requirements. It is therefore conceivable to introduce a cushioning or padding layer on the inside of the material 1 and/or between the PUR films 10, 30. This layer may be a PU foam, for example, which is sprayed between the layers extensively or only in certain places. In order to add the cushioning layer, the PUR films 10, 30 might be melted/welded only in certain locations. The unconnected cavities may then be filled with compressed air, PU foam, or other cushioning materials.

A three-dimensional structured textile reinforcing layer (three-dimensional mesh or spacer mesh) may also be used to provide the desired cushioning. Such a textile reinforcing layer may also comprise areas with different thicknesses. In a first area where cushioning is desired and where the PUR films are not connected to each other, the textile reinforcing layer may be designed with a correspondingly greater thickness. In a second area where no cushioning is desired and where the PUR films are connected to each other, the textile reinforcing layer may be designed in a correspondingly thin manner, as described above.

Figure 7:
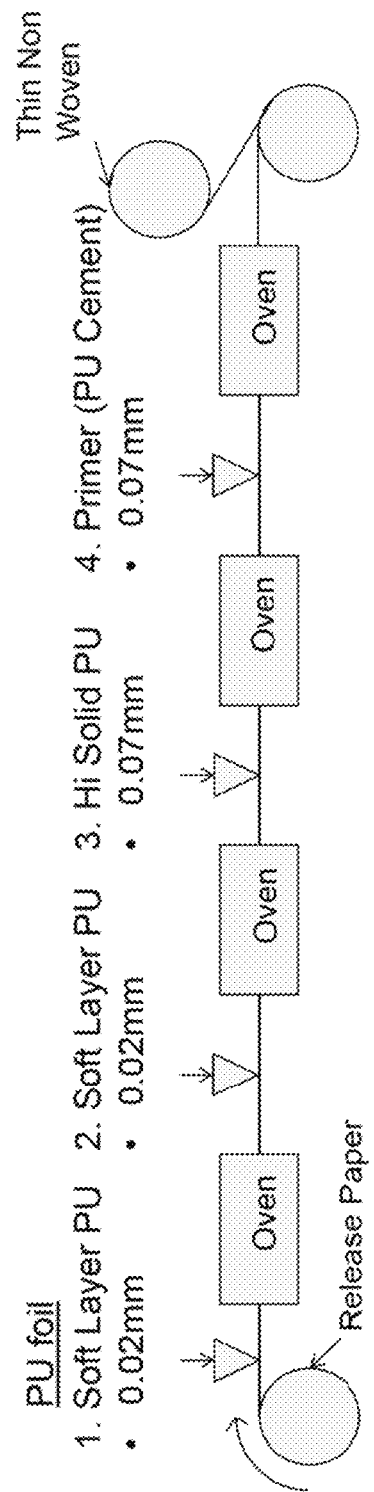
FIG. 7 is a diagram illustrating a production method of a polyurethane layer as used with certain embodiments of the present invention.

According to certain embodiments, FIG. 7 illustrates a method for manufacturing a polyurethane layer having four polyurethane sublayers and being used in the afore-mentioned material for a shoe upper. In these embodiments, a stirred formulation is melted and released into a container. The container may constantly be mixed by a continually moving device. The formulation may be dispersed from the bottom of the container evenly through a small gap of specified thickness. A continuously moving release paper passes below the container, thus dragging the mixture onto the release paper in a substantially uniform layer. The release paper may be embossed with a desired pattern and depth particular to design and/or function. The applied thickness of this first layer may also be monitored with a laser device, which scans from one side to the other, ensuring that thickness is applied consistently and evenly. For example, this first layer may have a thickness of about 0.02 mm.

Following this stage, the release paper may move through a heated oven at a relatively constant speed until the desired amount of drying and evaporation has occurred.

The process may then be repeated by applying a second layer of soft layer PUR on top of the first layer. This layer may also have a thickness of about 0.02 mm for example.

A third layer may then be applied to the second layer, wherein the third layer may have a thickness of about 0.07 mm for example. A second differing formulation may be included in this third application of PU. The above described process of applying the PUR layers may be repeated with the third layer. The third layer may be a thicker layer, which may be set and/or controlled according to the precision of the thicknesses of the first and second layers. Therefore, this third layer may need more time in an oven and/or a higher temperature must be used. Then the third layer is changed, a color and/or formula change may also be applied to both soft and hard PUR layers, depending on the features required.

The final application may apply a fourth layer whose function is to primarily assist with the bonding of the PUR layers to the textile reinforcing layer and the PUR layer located on the other side of the textile reinforcing layer. The PUR layers and release paper may be kept tight by moving through various roller combinations. Following the final oven stage, a very thin and light non-woven material sheet may be placed on top of the PUR surface for protection prior to rolling up for storage.

The final rolled up PUR film may be moved to a storage device where it is left to cure and stabilize, for example for 24 hours, before it is ready for use in shoe production.

According to certain embodiments, the polyurethane layer produced as described above may then be used to produce a material for a shoe upper according to the invention as follows: A polyurethane film or layer and a mesh material being used as the textile reinforcing layer with apertures are die cut. The mesh material is arranged between a first polyurethane layer and a second polyurethane layer. The material may be assembled on a silicon pad and pressed under a heat press. The material may be flipped around and rotated by approximately 90°. Thus, if the orientation was "landscape" before, it now is "portrait" and vice versa. The material may then be heat pressed a second time. By the above-described process, both polyurethane layers melt together through a plurality of the apertures of the mesh material. The first polyurethane layer may for example be the inner polyurethane layer as described above and the second polyurethane layer may be the outer polyurethane layer as described above. The situation may as well be reversed.

During pressing, the machine temperature may approximately be about 140° on both sides of the press. The assembly may be pressed for approximately 30 seconds. The pressure may be approximately 100 kg/cm².

Figure 8:
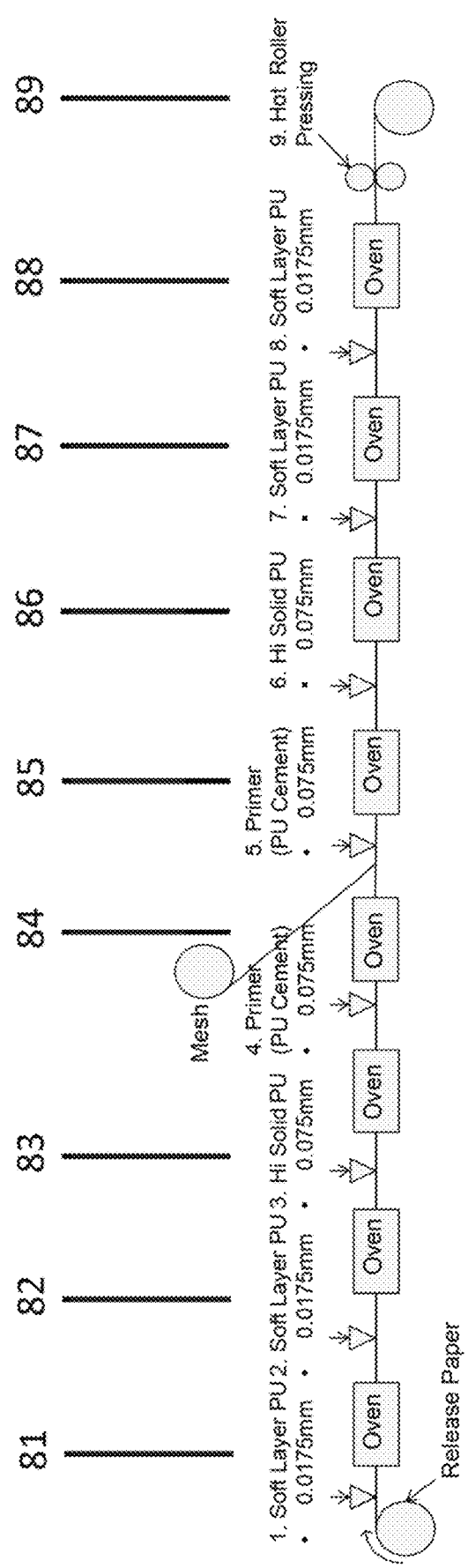
FIG. 8 is a diagram illustrating a production method of a material for a shoe upper according to certain embodiments of the present invention.

According to other embodiments, FIG. 8 illustrates an alternative method for producing the material 1 based on a liquid PUR method.

Steps 81 to 84 use the same production techniques as described above with respect to FIG. 7, with the exception of variable oven times. In these embodiments, the over e may be varied to ensure that the layer is not fully dry before applying a mesh. Thus, liquid polyurethane is poured directly onto a release paper. The liquid polyurethane may be applied in four sublayers. The first and second of these sublayers may have a thickness of approximately 0.0175 mm, while the third and fourth sublayers may have a thickness of approximately 0.075 mm.

Between steps 84 and 85, a textile reinforcing layer (e.g. mesh) is directly included in the process on top of the semi dry PUR layer. A light pressing step may also be included at this stage. The mesh may be the textile reinforcing layer having apertures as mentioned in this description.

In steps 85 to 88, the reverse order of sublayers is then applied using similar methods of inter-layer oven heating. At this stage, the material is almost fully dry. However, the sublayers on both sides next to the mesh may still be semi-liquid and, therefore, can bond through a plurality of the apertures of the mesh even without heat-pressing. Heat-pressing, such as in step 89, may further enhance the bond.

At step 89, a final hot roller at high pressure ensures full bonding of layer to layer and layer to mesh. The inner sublayers bond together through a plurality of the apertures in the mesh. At this stage, an embossment may be added through the roller on both sides (if the release paper is removed) or by release paper on one side. Because of the opportunity for molecular bonding here, there is a potential for a removal and/or replacement of the inner (sub)layers which are also called the primer (sub)layers.

Both methods being described with reference to FIGS. 7 and 8 include the potential to vary (sub)layer formula, color combination, and thickness to the features and specifications that are required on the shoe, requiring small changes in oven time or temperature. The number of sublayers is also changeable using the same production techniques. For example, a single sublayer, two sublayers, three sublayers or even more than four sublayers may be used. In addition, it is possible to vary the mesh type.

The present invention relates to a material for a shoe upper, in particular for soccer shoes, with a particularly low weight.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications can be made without departing from the scope of the claims below.

The which is claimed is:

1. A material for a shoe upper, the material comprising:
a first polyurethane layer;
a second polyurethane layer; and
a textile reinforcing layer between the first polyurethane layer and the second polyurethane layer, wherein the textile reinforcing layer comprises a plurality of apertures arranged in a first zone and a second zone of the textile reinforcing layer,
wherein, in the first zone, the first polyurethane layer and the second polyurethane layer are bonded together through the plurality of apertures of the textile reinforcing layer,
wherein, in the second zone, the first polyurethane layer and the second polyurethane layer are unconnected,
wherein the first polyurethane layer contacts the textile reinforcing layer in the first zone and the second zone, and
wherein the second polyurethane layer contacts the textile reinforcing layer in the first zone and the second zone.

2. The material of claim 1, wherein at least one of the first polyurethane layer and the second polyurethane layer comprises a plurality of sublayers.

3. The material of claim 2, wherein a first sublayer of the plurality of sublayers comprises a first melting point and a second sublayer of the plurality of sublayers comprises a second melting point greater than the first melting point.

4. The material of claim 3, wherein the first sublayer is arranged closer to the textile reinforcing layer than the second sublayer.

5. The material of claim 1, wherein at least one of the first polyurethane layer and the second polyurethane layer further comprises aliphatic isocyanate or a mixture of polyester and polyether.

6. The material of claim 1, wherein the first polyurethane layer and the second polyurethane layer comprise thermoset polyurethane.

7. The material of claim 1, wherein the textile reinforcing layer comprises a non-thermoplastic material.

8. The material of claim 1, wherein the textile reinforcing layer comprises a mesh material.

9. The material of claim 1, wherein at least one of the first polyurethane layer and the second polyurethane layer further comprises a polyurethane film.

10. The material of claim 1, further comprising a cushioning material in at least one of the apertures in the second zone of the textile reinforcing layer.

11. The material of claim 10, wherein the cushioning material comprises polyurethane foam or compressed air.

12. The material of claim 1, wherein the textile reinforcing layer comprises a first thickness at the first zone and a second thickness at the second zone, wherein the second thickness is larger than the first thickness.

13. The material of claim 1, wherein the plurality of apertures of the textile reinforcing layer comprise an area of about 0.25 mm2 to about 9 mm2.

14. A shoe upper comprising:
a first material arranged on at least a first area of the shoe upper, the first material comprising:
a textile reinforcing layer between an inner polyurethane layer and an outer polyurethane layer,
wherein the textile reinforcing layer comprises a plurality of apertures arranged in a first zone and a second zone of the textile reinforcing layer, wherein the inner polyurethane layer and the outer polyurethane layer are bonded together through the apertures of the textile reinforcing layer in the first zone, wherein the inner polyurethane layer and the outer polyurethane layer are unconnected in the second zone, wherein the inner polyurethane layer contacts the textile reinforcing layer in the first zone and the second zone, and wherein the outer polyurethane layer contacts the textile reinforcing layer in the first zone and the second zone.

15. The shoe upper of claim 14, wherein the textile reinforcing layer is a first textile reinforcing layer, wherein the inner polyurethane layer is a first inner polyurethane layer, and wherein the outer polyurethane layer is a first outer polyurethane layer, wherein the shoe upper further comprises:

a second material arranged on at least a second area of the shoe upper, the second material comprising:

a second textile reinforcing layer between a second inner polyurethane layer and a second outer polyurethane layer and comprises a plurality of apertures, wherein the second inner polyurethane layer and the second outer polyurethane layer are bonded together through the plurality of apertures of the second textile reinforcing layer, wherein the second area of the shoe upper is different from the first area of the shoe upper, and wherein the textile reinforcing layer of the first material is different from the second textile reinforcing layer of the second material.

16. The shoe upper of claim 15, further comprising a cushioning material in at least one of the apertures in the second zone of the second textile reinforcing layer.

17. The shoe upper of claim 16, wherein the cushioning material comprises polyurethane foam or compressed air.

18. The shoe upper of claim 14, wherein the first area of the shoe upper comprises a mid-foot area of the shoe upper.

19. A shoe, comprising the shoe upper of claim 14 and a sole.

* * * * *